(12) United States Patent
Choi

(10) Patent No.: US 7,864,421 B2
(45) Date of Patent: Jan. 4, 2011

(54) SYMMETRICAL PROJECTION SCREEN

(76) Inventor: Hae-Yong Choi, Mookdong I Park Apartment #108-301, 385 Mook-dong, Jungryang-gu, Seoul (KR) 131-768

(*) Notice: Subject to any disclaimer, the term of this patent is extended or adjusted under 35 U.S.C. 154(b) by 264 days.

(21) Appl. No.: 11/819,336

(22) Filed: Jun. 27, 2007

(65) Prior Publication Data

US 2008/0137186 A1 Jun. 12, 2008

(30) Foreign Application Priority Data

Dec. 7, 2006 (KR) .................. 20-2006-0031159 U

(51) Int. Cl.
*G03B 21/58* (2006.01)
(52) U.S. Cl. ..................................... 359/461
(58) Field of Classification Search ................. 359/449, 359/460, 461; 160/386
See application file for complete search history.

(56) References Cited

U.S. PATENT DOCUMENTS

| | | | | |
|---|---|---|---|---|
| 4,360,553 A * | 11/1982 | Landheer | ...................... | 428/45 |
| 5,337,179 A * | 8/1994 | Hodges | ...................... | 359/443 |
| 6,291,049 B1 * | 9/2001 | Kunkel et al. | .................. | 428/99 |
| 6,424,463 B1 * | 7/2002 | Nishitani | ..................... | 359/449 |
| 7,545,563 B2 * | 6/2009 | Chen | .......................... | 359/451 |
| 2007/0047077 A1 * | 3/2007 | Browning | ................... | 359/453 |
| 2008/0285125 A1 * | 11/2008 | Lee et al. | ..................... | 359/449 |

FOREIGN PATENT DOCUMENTS

WO    WO 2004036310 A1 *   4/2004   ................. 359/460

OTHER PUBLICATIONS

Goo Systems "Screen Good" Product website (Archive.org <http://www.goosystems.com/index.php?cont=screen> dated Mar. 17, 2006).*
Photo.net Post to topic "slide projection screen" by Rob F. dated Dec. 15, 2002.*
Dumont, Katie "Picture Perfect Framing" Lark Books 2000. Relevant portions.*

* cited by examiner

*Primary Examiner*—Christopher E Mahoney
*Assistant Examiner*—Leon W Rhodes
(74) *Attorney, Agent, or Firm*—Bacon & Thomas, PLLC

(57) ABSTRACT

Disclosed herein is a symmetrical projection screen. The screen includes a front screen member and a rear screen member. The front and rear screen members are made of a hard material, such as metal, or a hard film. Between the front and rear screen members is disposed a shock-absorbing member. The shock-absorbing member is made of a soft film having physical properties and material quality different from those of the front and rear screen members, such as compressed sponge, plastic foam, or poly vinyl chloride (PVC). The front screen member and the rear screen member are arranged in a front-and-rear symmetrical structure about the shock-absorbing member. Consequently, the deformation factors, such as external pressure or the change in the weather, are extinguished or cut off by the shock-absorbing member, whereby the flatness of the screen is maintained.

2 Claims, 6 Drawing Sheets

SYMMETRICAL PROJECTION SCREEN

BACKGROUND OF THE INVENTION

1. Field of the Invention

The present invention relates to a projection screen, and, more particularly, to a symmetrical projection screen having screen surfaces constructed in a front-and-rear symmetrical structure, whereby the flatness of the screen is considerably improved.

2. Description of the Related Art

The flatness of a screen is one of the most important factors of the screen.

Specifically, when the screen is not flat, a wave and wrinkle phenomenon occurs on the screen, and therefore, an image may be nonuniformly displayed on the screen. Especially in the case of a reflection type screen having high reflexibility, the wave and wrinkle phenomenon is deepened, and therefore, the normal use of the screen is not possible.

According to circumstances, a plurality of screen units 4 may be transported while being separated from each other, and then may be assembled in a site to construct a large-sized screen.

In this case, the screen units 4 may be incorrectly assembled due to the change in the weather, the transportation environment, and the assembly method.

When the screen units 4 are vertically assembled in a two-stage structure, the lower screen unit 4 may be deformed due to the weight of the upper screen unit 4.

In the case of a roll screen as shown in FIG. 3, the screen is unrolled downward when in use, and the screen is rolled upward when in safekeeping. As the rolling and unrolling operation of the screen is repeatedly carried out, and seasons or weathers are changed, however, the left and right sides of the screen shrink inward (a concave phenomenon), and the surface of the screen is wrinkled in the form of waves (a wave phenomenon).

SUMMARY OF THE INVENTION

Therefore, the present invention has been made in view of the above problems, and it is an object of the present invention to provide a symmetrical projection screen having screen surfaces constructed in a front-and-rear symmetrical structure, whereby the flatness of the screen is considerably improved.

In accordance with one aspect of the present invention, the above and other objects can be accomplished by the provision of a symmetrical projection screen including a front screen member made of a hard material, the front screen member constituting a front surface of the screen, a rear screen member made of the same material as the front screen member, the rear screen member constituting a rear surface of the screen, and a shock-absorbing member disposed between the front screen member and the rear screen member, the shock-absorbing member being made of a soft material different from that of the front screen member and the rear screen member, wherein the front screen member and the rear screen member are arranged in a front-and-rear symmetrical structure about the shock-absorbing member, whereby the flatness of the screen is maintained.

In accordance with one aspect of the present invention, there is provided a symmetrical projection screen including a front screen member made of a hard film, the front screen member constituting a front surface of the screen, a rear screen member made of the same film as the front screen member, the rear screen member constituting a rear surface of the screen, and a shock-absorbing film disposed between the front screen member and the rear screen member, the shock-absorbing film being a soft film different from that of the front screen member and the rear screen member, wherein the front screen member and the rear screen member are arranged in a front-and-rear symmetrical structure about the shock-absorbing film, whereby the flatness of the screen is maintained.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

Figure 1:
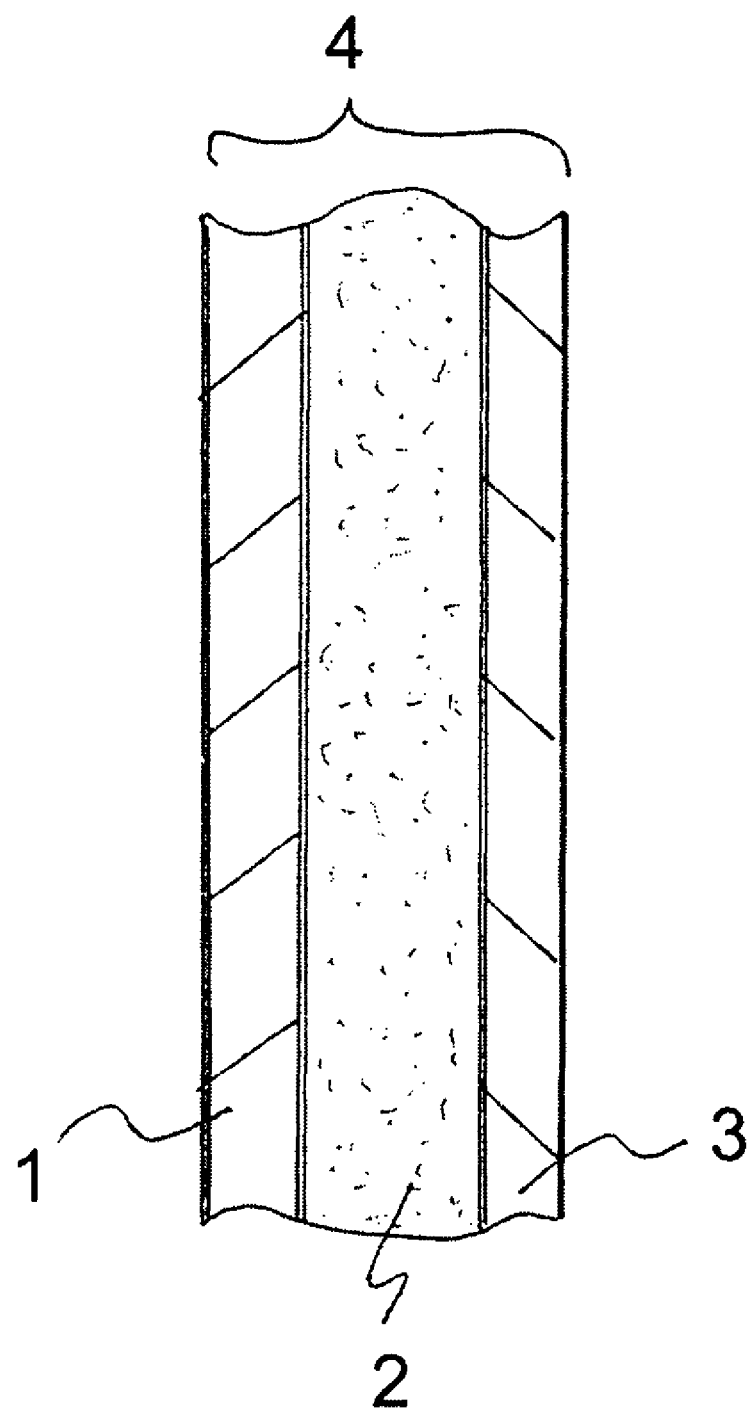
FIG. 1 is a side sectional view, in part, illustrating the symmetrical structure of a projection screen according to a preferred embodiment of the present invention.

FIG. 1 is a side sectional view, in part, illustrating the symmetrical structure of a screen unit 4 according to a preferred embodiment of the present invention.

The screen unit 4 is constructed such that the screen unit 4 has a thickness appropriate for the purpose of use. As shown in FIG. 1, the screen unit 4 includes a front screen member 1 constituting the front surface of the screen, on which an image is focused. The front screen member 1 is made of a hard material, for example, metal such as aluminum.

To the rear of the front screen member 1 is attached a shock-absorbing member 2. The shock-absorbing member 2 is made of compressed rubber, compressed urethane, compressed sponge, or plastic foam. In other words, the shock-absorbing member 2 is made of a material having softness and elasticity as compared to the front screen member 1. In addition, the shock-absorbing member 2 is made of a material having physical properties and material quality different from those of the front screen member 1.

To the rear of the shock-absorbing member 2 is attached a rear screen member 3, which is made of a material having the same thickness, material quality, and softness as the front screen member 1.

That is, the present invention is characterized in that the hard front screen member 1 and the hard rear screen member 3 are attached to the front and the rear of the soft shock-absorbing member 2 in a symmetrical structure, and the front screen member 1 and the rear screen member 3 are made of the same material while the shock-absorbing member 2 is made of a material different from that of the front screen member 1 and the rear screen member 3.

Generally, a screen unit made of a single material may be bent or deformed when external pressure, external impacts, or external deformation factors, such as load, are applied to the front and/or rear surface of the screen unit.

According to the present invention characterized in that the front screen member 1 and the rear screen member 3 are made of the same material, the front screen member 1 and the rear screen member 3 are arranged in a front-and-rear symmetrical structure, and the shock-absorbing member 2 is disposed between the front screen member 1 and the rear screen member 3, on the other hand, external pressure or external deformation factors applied to the front and/or rear surface of the screen unit are absorbed into the shock-absorbing member 2 with the result that the pressure or the deformation factors are extinguished, and therefore, the flatness of the screen unit is maintained. Even when there are changes in the temperature or the humidity, the flatness of the screen unit is maintained due to the symmetrical structure of the front screen member 1 and the rear screen member 3 about the shock-absorbing member 2.

Figure 3:
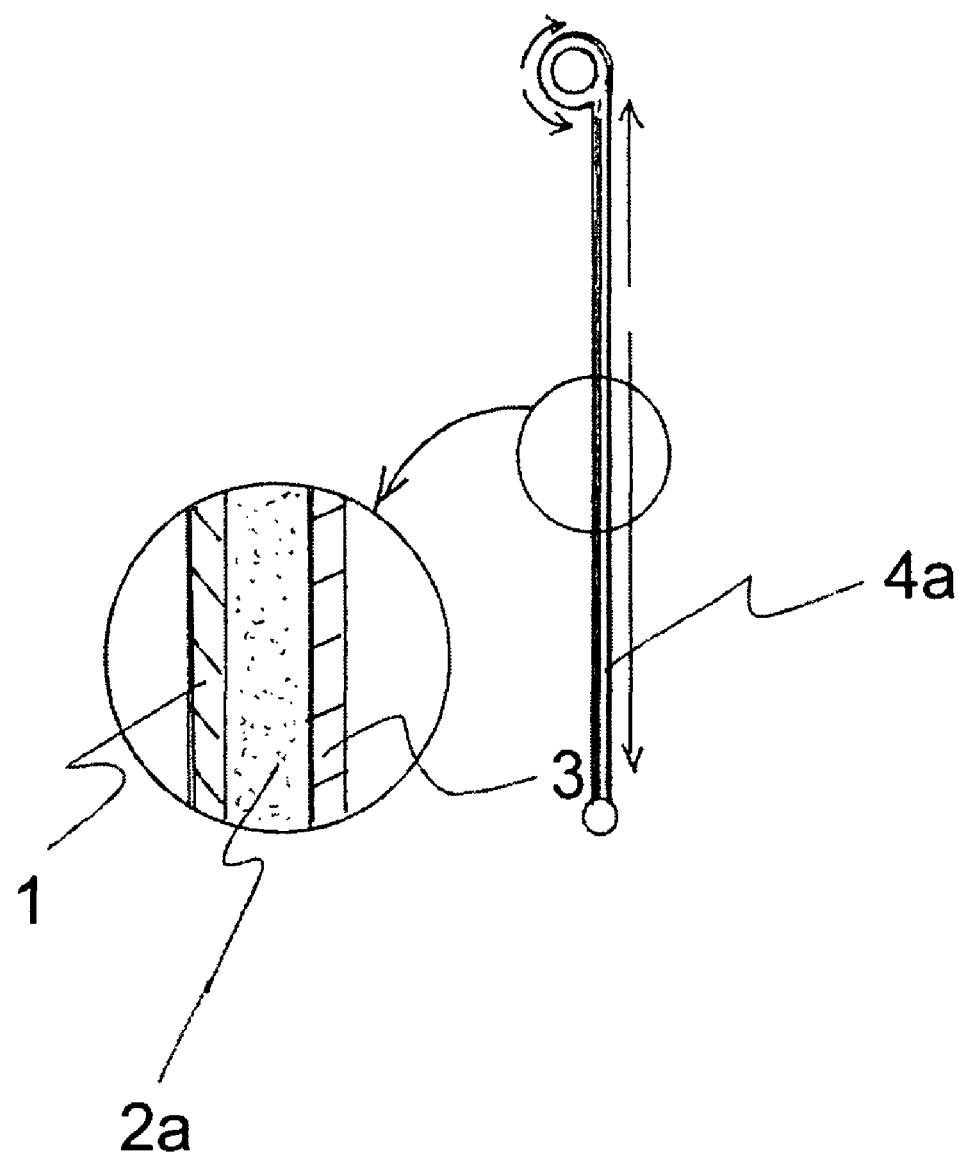
FIG. 3 is a side view illustrating the symmetrical structure of a roll screen according to another preferred embodiment of the present invention.

FIG. 3 is a side view illustrating the symmetrical structure of a roll screen according to another preferred embodiment of the present invention.

As shown in FIG. 3, the screen includes a front screen member 1, a rear screen member 3, and a shock-absorbing film 2a disposed between the front screen member 1 and the rear screen member 3. The front screen member 1 and the rear screen member 3 are made of a hard film, and the shock-absorbing film 2a is made of a soft film, such as poly vinyl chloride (PVC) or urethane. The front screen member 1 and the rear screen member 3 are made of the same material, and the front screen member 1 and the rear screen member 3 have the same thickness.

In the case of the roll screen as shown in FIG. 3, external pressure or external deformation factors, such as load, applied to the front screen member 1 and the rear screen member 3 are absorbed into the shock-absorbing film 2a with the result that the pressure or the deformation factors are extinguished, and therefore, the flatness of the screen is maintained.

Since the front screen member 1 and the rear screen member 3 are made of the same material, and the front screen member 1 and the rear screen member 3 have the same thickness, the flatness of the screen is maintained due to the symmetrical structure of the front screen member 1 and the rear screen member 3 about the shock-absorbing film 2a, even when there are changes in the temperature or the humidity.

Figure 4:
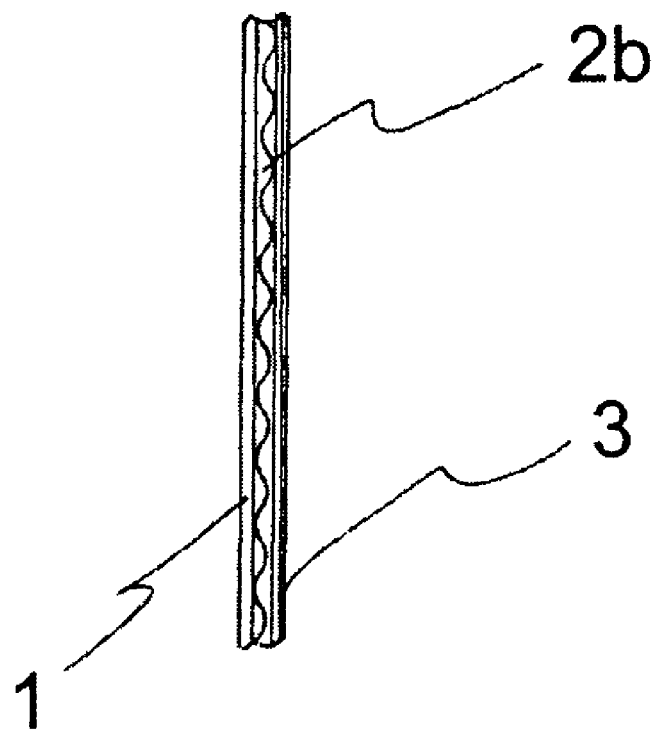
FIG. 4 is a side sectional view, in part, illustrating a screen according to another preferred embodiment of the present invention.

FIG. 4 is a side sectional view, in part, illustrating a screen according to another preferred embodiment of the present invention.

The screen shown in FIG. 4 is characterized in that an elastic frame 2b is disposed between the front screen member 1 and the rear screen member 3.

Figure 6:
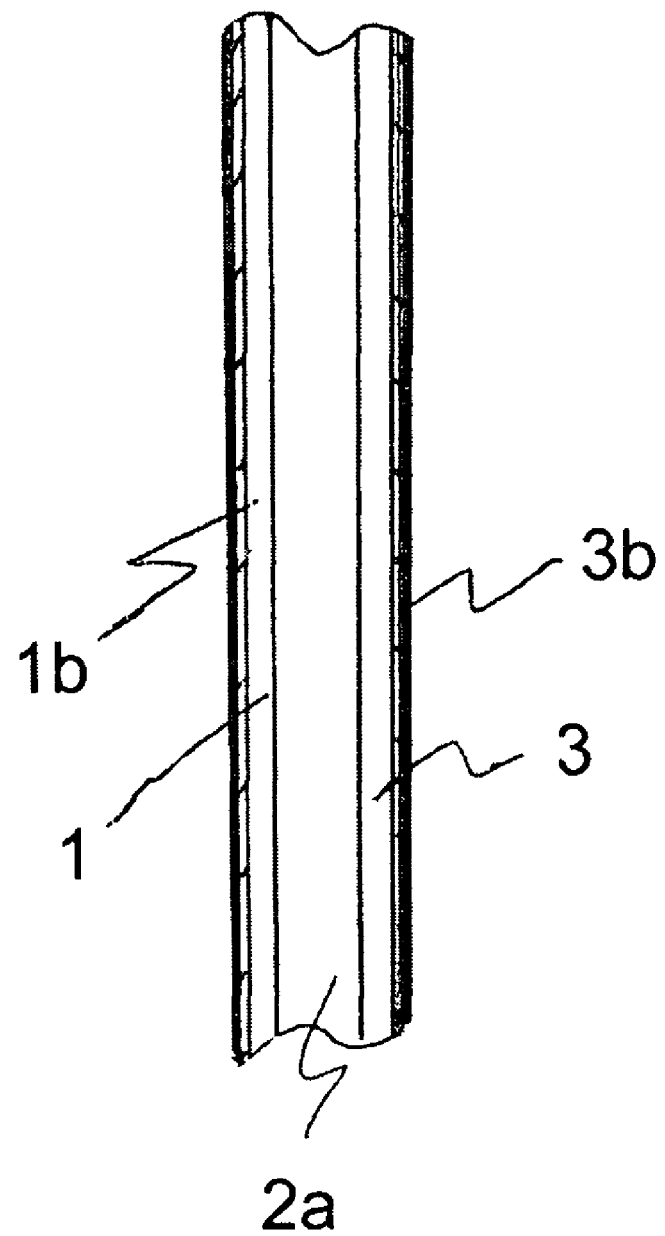
FIG. 6 is a side sectional view, in part, illustrating a screen, to front and rear screen members of which additive soft members are attached, according to a further preferred embodiment of the present invention.

The screen may be constructed in a structure as shown in FIG. 6. As shown in FIG. 6, an additive soft front screen member 1b is attached to the front of the hard front screen member 1, and an additive soft rear screen member 1c is attached to the rear of the hard rear screen member 3 such that the front screen members 1b and 1 and the rear screen members 1c and 3 are arranged in a symmetrical structure about the shock-absorbing film 2a.

In this case, the surface of the screen is soft, and therefore, the sound-absorbing efficiency of the screen is improved. That is, an image is transmitted through the soft surface of the screen, and acoustic sound is absorbed into the soft surface of the screen.

When the screen is made of a soft material, the flatness of the screen is not secured. For this reason, as shown in FIG. 6, the hard front screen member 1 is attached to the rear of the soft front screen member 1b, and the hard rear screen member 3 is attached to the front of the soft rear screen member 3b in the same manner as the attachment between the hard front screen member 1 and the soft front screen member 1b. Also, the hard front screen member 1 and the soft front screen member 1b are made of the same material as the hard rear screen member 3 and the soft rear screen member 3b, and the hard front screen member 1 and the soft front screen member 1b have the same thicknesses as the hard rear screen member 3 and the soft rear screen member 3b. Furthermore, the front screen members 1b and 1 and the rear screen members 1c and 3 are arranged in a symmetrical structure about the shock-absorbing film 2a. Consequently, the flatness of the screen is maintained.

When the screen units 4 are bent such that the screen units 4 are connected with each other in a curved shape, it is possible to construct a curved screen having high flatness. In this case, it is required that the front screen member 1 and the rear screen member 3 have the same curvature so as to maintain the flatness of the screen.

When the front screen member 1 and the rear screen member 3 have softness, physical properties, and strength identical or similar to those of the shock-absorbing member 2 or the shock-absorbing film 2a, the front screen member 1 and the rear screen member 3 may be deformed due to the deformation factors deforming the shock-absorbing member 2 or the shock-absorbing film 2a. For this reason, the shock-absorbing member 2 or the shock-absorbing film 2a is made of a material different from that of the front screen member 1 and the rear screen member 3 such that the deformation factors, such as external temperature or humidity, can be effectively cut off by the combination of the different materials.

The reason why the shock-absorbing member 2 or the shock-absorbing film 2a is made of a soft material as compared to the front screen member 1 and the rear screen member 3 is to reduce the deformation factors, such as external pressure applied to the front screen member 1 and the rear screen member 3, using the elasticity or the softness of the shock-absorbing member 2 or the shock-absorbing film 2a.

Figure 5:
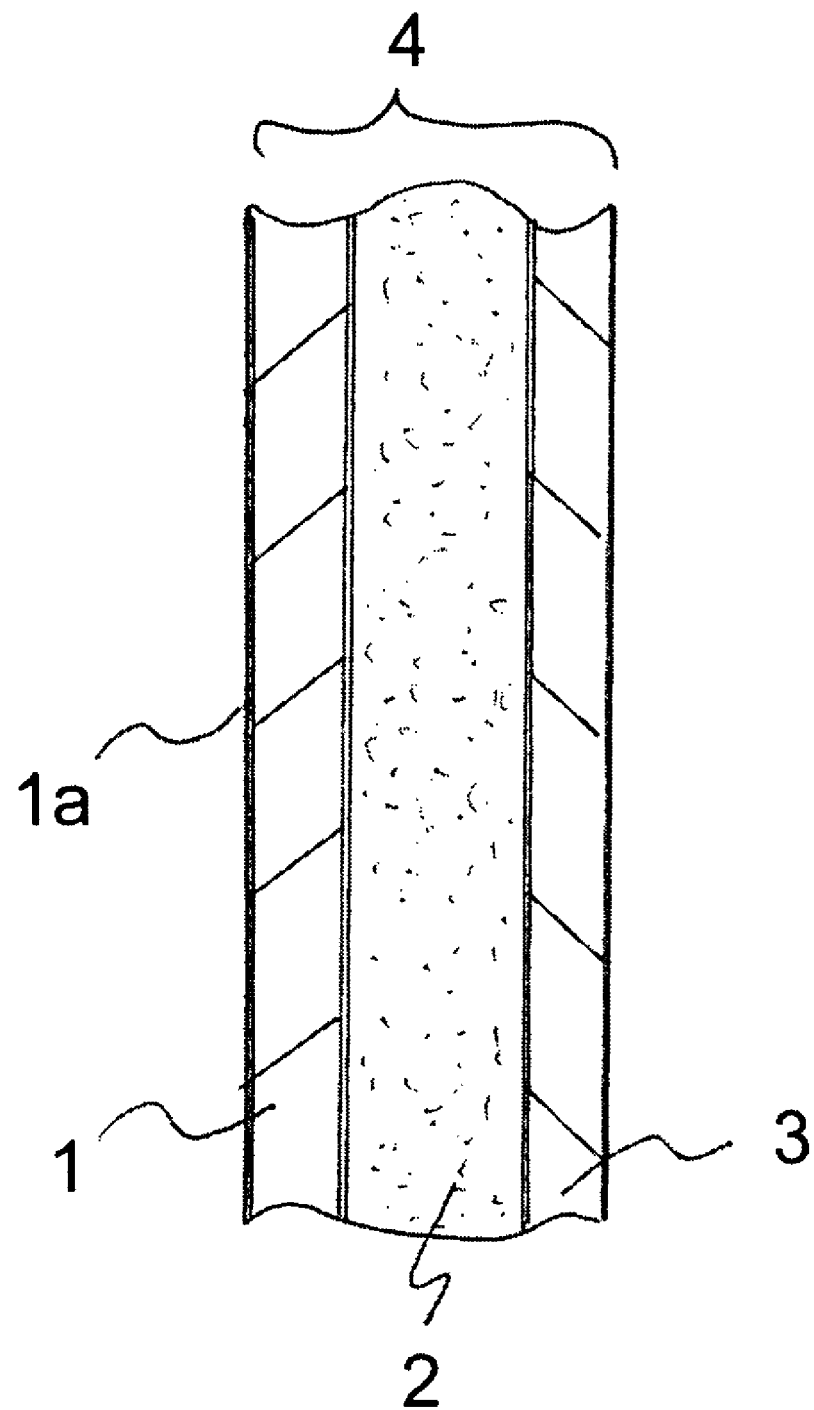
FIG. 5 is a side sectional view, in part, illustrating a screen, to the front surface of which a thin film is attached, according to another preferred embodiment of the present invention.

FIG. 5 is a side sectional view, in part, illustrating a screen, to the front surface of which a thin film is attached, according to another preferred embodiment of the present invention. As show in FIG. 5, a thin film 1a may be attached to the front of the front screen member 1 so as to make the surface of the screen uniform. In this case, the film 1a has an appropriate thickness within a range of tensile strength error of the front screen member 1.

As can be seen from the above description, the solidity of the screen according to the present invention is decided by the material quality and the hardness of the front screen member 1 and the rear screen member 3 constituting the front and rear surfaces of the screen unit 4, and the thickness of the screen according to the present invention is decided by the sum of the thickness of the shock-absorbing member 2, the thickness of the front screen member 1, and thickness of the rear screen member 3.

Consequently, it is possible to reduce the weight of the screen according to the present invention to ½ or less that of a conventional screen made of a single material.

On the assumption that the thickness of a screen unit appropriately connected to another screen unit so as to construct a large-sized screen is 5 mm, for example, the front screen member 1 has a thickness of 1 mm, the rear screen member 1 has a thickness of 1 mm, and the shock-absorbing member 2, such as compressed sponge, has a thickness of 3 mm. The weight of the screen unit 4 having the total thickness of 5 mm is reduced to approximately ½ or less that of a screen unit made of aluminum having a thickness of 5 mm. As a result, the flatness of the screen according to the present invention is maintained.

Figure 2:
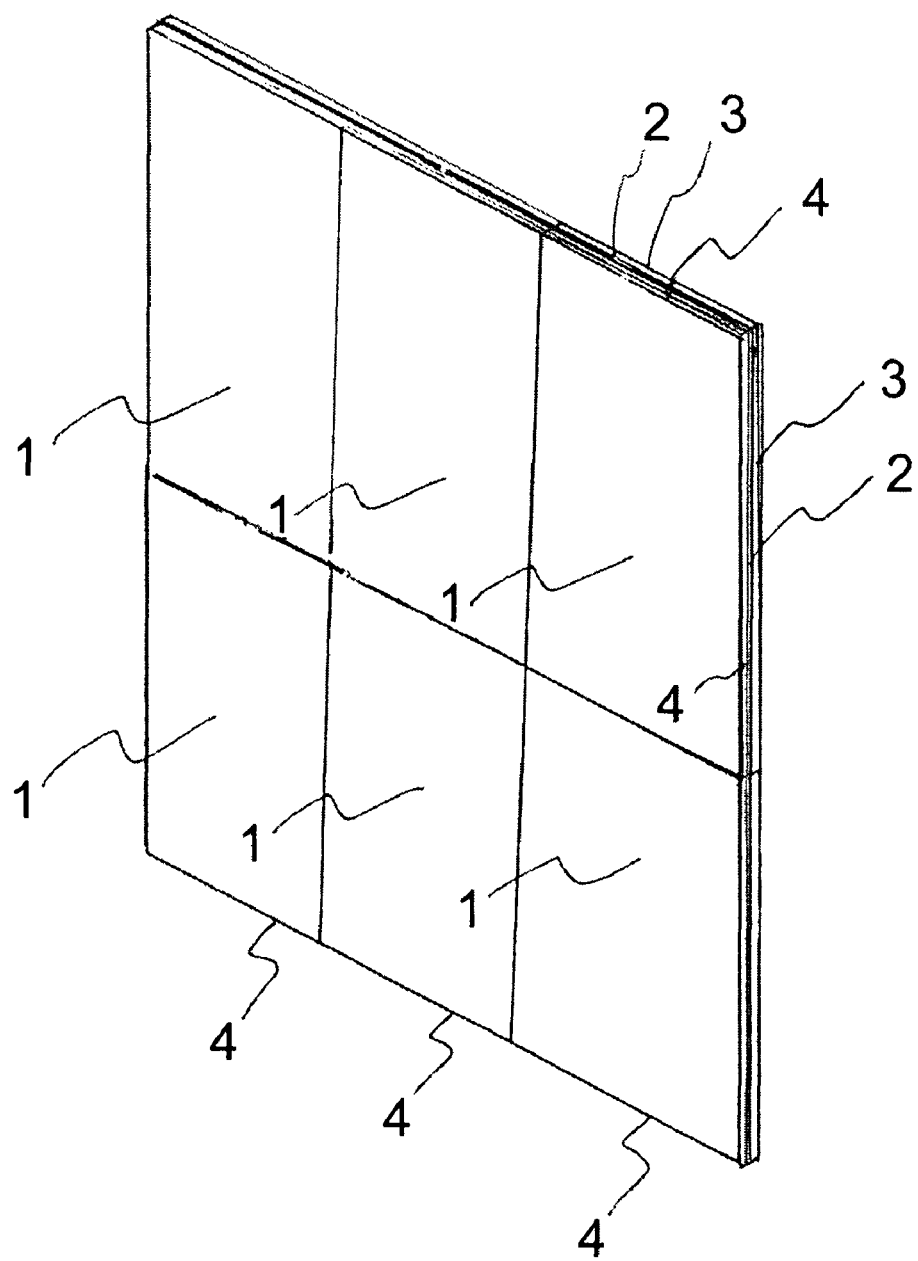
FIG. 2 is a perspective view illustrating a large-sized screen according to another preferred embodiment of the present invention.

Consequently, when a plurality of screen units 4 are connected with each other so as to construct a large-sized screen, as shown in FIG. 2, the upper-row screen units 4 are relatively lightweight, and therefore, load and stress applied to the lower-row screen units 4 are reduced accordingly.

This principle is equally applied to the roll screen structure as shown in FIG. 3.

Specifically, although a screen member 4a of the roll screen according to the present invention has the same thickness as a conventional screen, the weight of the screen member 4a is reduced to approximately ½ or less that of the conventional screen, and therefore, the deformation of screen member 4a is effectively prevented.

As apparent from the above description, when the present invention is applied to either a flat screen or a curved screen, the front screen member and the rear screen member of the screen unit are arranged in a symmetrical structure while the shock-absorbing member is disposed between the front screen member and the rear screen member. Consequently, the flatness of the screen according to the present invention is maintained.

In the case of a roll screen, the hard front screen film and the hard rear screen film, which is identical to the hard front screen film, are arranged in a symmetrical structure while the shock-absorbing film is disposed between the hard front screen film and the hard rear screen film. Consequently, the deformation factors, such as weather or humidity, can be effectively absorbed into the shock-absorbing film, and therefore, the flatness of the screen according to the present invention is maintained.

Furthermore, the weight of the screen unit or the screen member according to the present invention is reduced to approximately ½ or less that of a conventional screen made of a single material and having the same thickness as the screen unit or the screen member according to the present invention, and therefore, the flatness of the screen according to the present invention is maintained.

Consequently, the present invention provides a symmetrical screen very useful as a projection screen continuously requiring the flatness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A symmetrical projection roll screen comprising:
a rollable front screen member made of a hard film, the front screen member constituting a front surface of the screen;
a rollable rear screen member made of the same film as the front screen member, the rear screen member constituting a rear surface of the screen; and
a rollable shock-absorbing film disposed between the front screen member and the rear screen member, the shock-absorbing film being a soft urethane film different from that of the front screen member and the rear screen member, wherein
the front screen member and the rear screen member are arranged in a front-and-rear symmetrical structure about the shock-absorbing film, whereby the flatness of the screen is maintained.

2. The screen according to claim 1, wherein the front screen member is provided at the front thereof with an additive soft front screen member, and the rear screen member is provided at the rear thereof with an additive soft rear screen member.

* * * * *